June 15, 1954     H. W. JARROW     2,680,888
REPLACEMENT GASKET FOR REFRIGERATOR DOORS AND THE LIKE
Filed Jan. 8, 1952
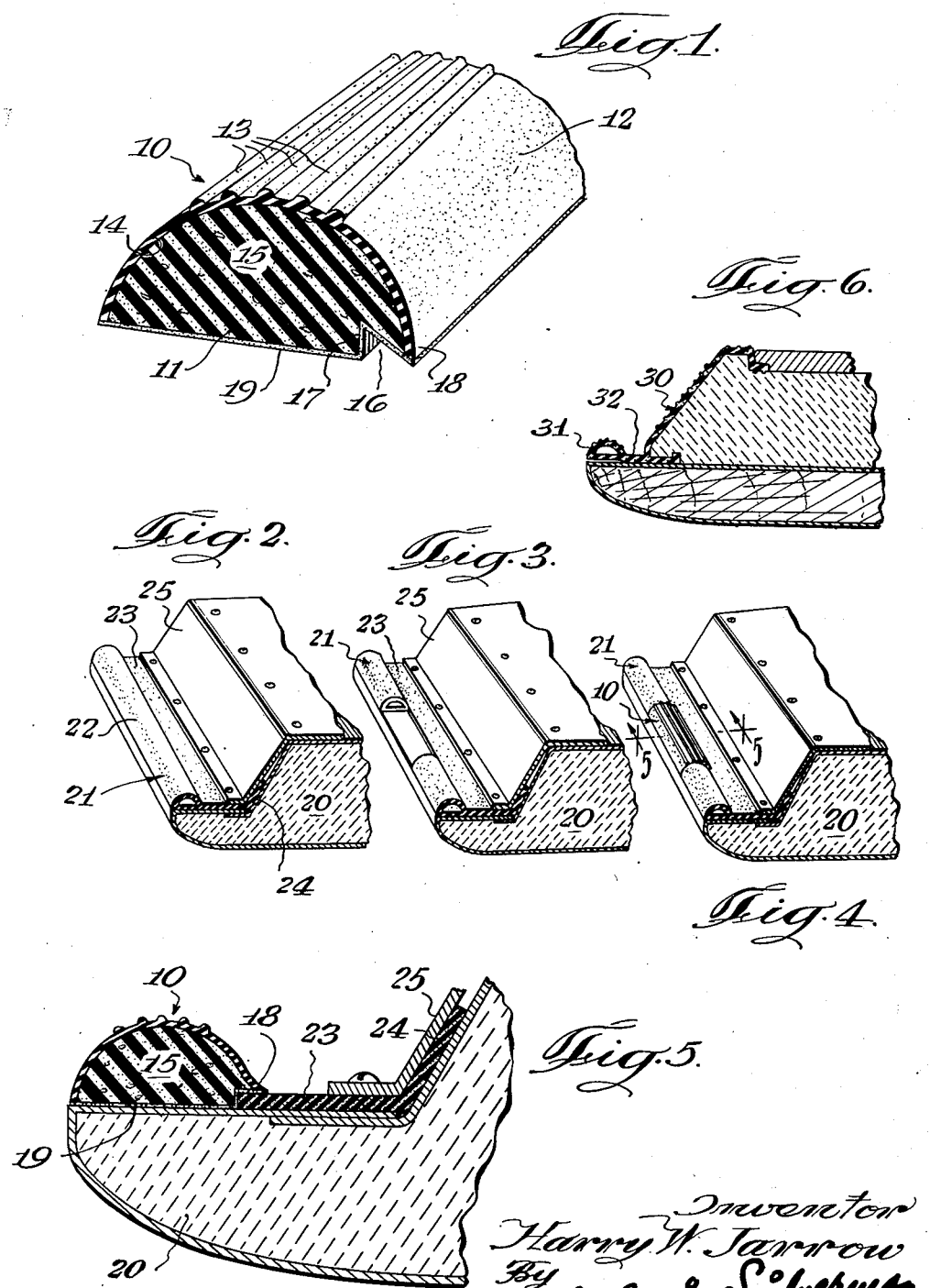

Patented June 15, 1954

2,680,888

UNITED STATES PATENT OFFICE 2,680,888

REPLACEMENT GASKET FOR REFRIGERATOR DOORS AND THE LIKE

Harry W. Jarrow, Chicago, Ill.

Application January 8, 1952, Serial No. 265,400

4 Claims. (Cl. 20—69)

This invention relates generally to gaskets and more particularly is concerned with a replacement gasket for refrigerator doors.

It is essential in the construction of refrigerators, storage chambers and the like that the doors and openings thereof be gasketed to prevent the loss of cold air and the entrance of the heated air. Many different designs and configurations of gaskets are used. Generally the gasket comprises a beading or edging of some rubbery material secured to the periphery of the door edge and adapted to be sandwiched between the door and the door frame when the door is closed. The gasket is usually intended to be compressed, and thus may be resilient, yielding, etc. In many cases various kinds of lips, ridges, and the like are formed for cooperation with the door frames in some manner.

The yielding nature of these gaskets gives rise to considerable wear long before the door or any other part thereof requires replacing and hence the service of such doors by gasket replacement is frequent. Where the configuration of the gasket is not simple, or where the gasket is constructed so that the door must be taken apart in order to replace the same, replacing the gasket is expensive and annoying. Furthermore, where only a small part of the gasket is worn, it is wasteful to replace the entire gasket. In such cases, it has been customary in the trade for the serviceman to cut away the beading at the worn spot and merely replace the same with a short length of replacement gasket.

This invention relates specifically to this type of replacement gasket and the principal object is to provide such a replacement gasket suitable for securement in place of the removed portion of refrigerator door gaskets which is more securely applied than those of the prior art, and which provides a joint incapable of gathering dirt and debris.

A further object of the invention is to provide a replacement gasket which has an undercut, generally triangular cross section groove giving rise to a tapered lip readily engaged upon the web of the gasket being repaired and secured thereto with continuous pressure to form a tight and permanent joint.

Other objects of the invention lie in the construction of a novel and improved replacement gasket which is suitable for use in connection with many different types of gaskets and which will render efficient insulation service for the installation.

Many other objects of the invention will appear as the description of the invention proceeds in connection with which I have illustrated a preferred embodiment and explained the same in order to point out the salient features and advantages thereof.

The drawing illustrates such a preferred embodiment, and like characters represent like or similar parts throughout the several figures of such drawing in which:

Fig. 1 is a perspective view of a length of my gasket showing the cross-sectional configuration thereof.

Fig. 2 is a perspective view of a fragment of a gasketed refrigerator door showing same with the originally installed gasket.

Fig. 3 is a view similar to Fig. 2 except that a section of the beading of the said gasket has been removed.

Fig. 4 is a similar view except that the section which has been removed has now been replaced by a short length of the gasket of my invention.

Fig. 5 is a sectional view through the door along the line 5—5 of Fig. 4 and on an enlarged scale showing the manner in which my replacement gasket is associated with the original gasket.

Fig. 6 is a sectional view through a refrigerator door merely illustrating another type of gasket which can be repaired by means of my replacement gasket.

Referring now to the figures, the reference character 10 is used generally to designate my new gasket. A short length of the same is illustrated in Fig. 1, it being understood that I may produce same in long lengths or rolls for use by the service man. It is intended that the desired length be severed and used as necessary. The gasket member 10 is formed as a bead or molding having a generally semi-circular cross section. The base 11 is intended to engage the edge of the refrigerator door, and the rounded top 12 is free to engage the door frame when the refrigerator door is closed. If desired, the rounded top portion may have elongate ridges 13 in order to form a better seal when the door is closed, but these are not essential.

The gasket member may be made of extruded rubber, either natural or synthetic, or of any other rubbery substance. When the word "rubber" is used hereinafter, all of such equivalents will be intended. Although not essential, I prefer to form the gasket member with a skin or jacket 14 of vulcanized rubber or the like and a core 15 of some spongy material such as sponge rubber. In this manner the resilience required is present but the outer surface which receives the worst wear is tough.

In one lower corner I provide a groove 16 running the entire length of the gasket member and formed therewith. It will be noted that the grove 16 is triangular in cross section, and hence the groove is undercut with respect to the rounded top 12 of the gasket member 10. Thus, considering the base 11 as a horizontal reference plane, the vertical wall 17 of the groove 16 extends upward a substantial distance, while the lip 18 formed by virtue of the groove 16, practially meets the horizontal reference plane. This lip is thus quite resilient, being tapered due to the undercut arrangement of the groove 16.

The entire bottom, including the groove 16, of the gasket member 10 is preferably covered with an adhesive 19. I prefer an adhesive, well-known commercially as "Dri-Back" cement, which is normally dry and is soluble in rubber solvents such as carbon tetrachloride. The adhesive is applied to the gasket member 10 during manufacture thereof and the service man merely moistens the same with a suitable solvent to cause same permanently to adhere to glass, wood, metal, etc. The adhesive 19 may be of any type, and can even be omitted from the lengths of gasket 10 during manufacture. Thus service personnel using the same may apply some adhesive during replacement.

The groove 16 serves to engage upon the web of a gasket being "repaired" to provide a simple corner joint which will not readily gather dirt and debris and which will be smooth and neat appearing. The fact that the groove is undercut enables the gasket 10 to be applied with the lip 18 under permanent pressure tending to press the same against the web of the "repaired" gasket at the weakest point of engagement. This provides a clean and tight joint.

In Fig. 2, I have shown a portion of a typical refrigerator door 20 having a rubber gasket 21 mounted thereon. Note that the gasket has a bead 22 mounted on the edge of the refrigerator door 20, an integral web 23, and an integral flanged portion 24. The flanged portion 24 and the edge of the web 23 are engaged beneath a metal plate 25 which is screwed or nailed to the inside of the refrigerator door. Obviously, to replace the gasket 21 it would be necessary to remove the metal plate 25. The ordinary service man is not trained to do this, and furthermore, it is rare that the entire gasket needs replacing. More often, only a small portion of the bead 22, which has become worn or frayed, requires replacement.

In Fig. 3, I have illustrated the same portion of door as shown in Fig. 2, and it will be noted that a portion of the bead 22 has been removed. The serviceman merely cuts along the web 23 with a sharp instrument such as a razor blade, and then cuts across the bead 22 defining the section he desires to remove. Thereafter he cuts a short section of the replacement gasket member 10 equal in length to the portion of the bead 22 previously removed. He may have various sizes of the gasket members 10. Preferably he chooses a size in which the height of the replacement gasket member 10 is substantially equal to that of the bead, but the width of which is slightly larger. The gasket member 10 may be formed with a cross section like a somewhat flattened semi-circle, i. e., somewhat oval.

The service man moistens the adhesive 19 and presses the section 10 in place as shown in Fig. 4, with the lip 18 engaged over the web 23. The groove 16 being undercut, the lip 18 will be slightly compressed, but this will cause the joint between the lip and the top of the web 23 to be very tight and unlikely to open. Dirt, moisture, grease, and debris will thereby be prevented from entering the joint. There is another important purpose for the joint 16 to be undercut. The thickness of the webs of various gaskets varies, and hence, the lip 18 can conform to almost any thickness of web in the formation of a tight joint. In Fig. 5, I have shown an enlarged sectional view of the joint resulting from the replacement of the bead section with a short length of the gasket 10.

It is desired to point out that the specific gasket 21 is not the only type of gasket which can be "repaired" by the use of my new invention. Practically any type of gasket which has an edge bead can have the bead replaced in sections by the use of my replacement gasket. In Fig. 6 I have shown a rather complex type of gasket 30 the replacement of which is quite difficult. The bead 31 of this gasket easily can be replaced by cutting the web 32 in the same manner as described in connection with Figs. 2, 3, 4 and 5, and then installing a section of the gasket 10.

It is believed that the invention and its mode of construction and application, as well as its many advantages readily should be understood without further description, and it should be manifest that no intention of being limited is to be inferred from the description of the preferred embodiment. Obviously wide variations in minor and insignificant details are capable of being made without departing from the spirit of the invention as described in the appended claims.

What I claim and desire to secure by Letters Patent of the United States is:

1. A replacement gasket adapted to be adhered to a refrigerator door or the like in place of the beading of a permanently attached gasket which has a web connected to said beading, which comprises, a resilient member having a generally semi-circular section, there being a groove formed in the bottom thereof at one corner, said groove adapted to provide a lip for engagement over a gasket web in replacement of the bead thereof, said lip being tapered and highly resilient and extending substantially to the plane of the base of the said replacement gasket whereby in applying the said lip to a web, the said lip will require to be compressed to produce thereby a tight joint.

2. A replacement gasket adapted to be adhered to a refrigerator door or the like in place of the beading of a permanently attached gasket which has a web connected to said beading, which comprises, a resilient member having a generally semi-circular section, there being a groove formed in the bottom thereof at one corner, said groove adapted to provide a lip for engagement over a gasket web in replacement of the bead thereof, the diameter of the circle forming the base of said replacement gasket and there being an adhesive on the entire base of said gasket including the groove.

3. As a new article of manufacture, a replacement gasket member having at least a rubber outer skin, said member being substantially semi-oval in cross section, forming thereby a rounded top and a flat bottom, a groove in the gasket bottom adjacent one edge thereof, but undercutting the edge so that the said edge extends substantially to the plane of the bottom, the groove having a cross sectional configuration such that it slants from the root of the groove towards the said end edge thereby forming a narrow wedge-like lip of substantial resilience.

4. A gasket member for replacing a worn out portion of a gasket permanently secured on a refrigerator door, said permanent gasket having a beading attached to a web normally engaged beneath a portion of said door, the worn out portion being in the beading, said gasket member having at least a rubber outer skin and a beading of generally semi-circular configuration substantially the same as the beading of the permanent gasket and forming a rounded top and flat bottom along the entire length of said member, a step in the said bottom adjacent an edge thereof, the face of the step forming an acute angle with the vertical wall of said step whereby to provide a narrow wedge-like lip of substantial resilience, said bottom and step having an adhesive thereon, said member adapted to be mounted with the beading thereof replacing said worn out portion and the lip overlying the web adjacent said worn out portion and spaced from said portion of the door.

References Cited in the file of this patent

UNITED STATES PATENTS

| Number | Name | Date |
|---|---|---|
| 456,058 | Poe et al. | July 14, 1891 |
| 2,206,717 | Dodge | July 2, 1940 |
| 2,280,254 | Nave | Apr. 21, 1942 |